Patented Feb. 25, 1936

2,031,673

UNITED STATES PATENT OFFICE 2,031,673

PROCESS FOR PROTECTING LEATHERS, SKINS, FABRICS, AND THE LIKE DURING THEIR MANIPULATION OR MAKING UP INTO MANUFACTURED GOODS

Robert Schneider, Paris, and Armand Poelman, Charenton, France, assignors to Materials Protector Corporation, Newark, N. J., a corporation of New Jersey No Drawing. Application December 4, 1929, Serial No. 411,668. In France December 8, 1928

2 Claims. (Cl. 91—68)

Leathers, skins, imitation-leathers, fabrics and the like employed in the manufacture of fancy leather goods, the making of shoes and industries of the same kind, undergo during their various transformations, their manipulation and their shaping by machine or by hand, deteriorations and markings, which it is almost impossible to avoid. This drawback is particularly noticeable in the case of leathers, skins, fabrics, etc. of light colour or white, which whatever steps be taken cannot recover their original bloom.

The process forming the object of the invention allows of obviating this drawback. It consists in covering the leathers, skins, fabrics, etc., before their use, with a protective coating, elastic in order to allow distortion during the stretching or shaping, and slightly adherent so as not to become detached in the course of the various manipulations, but to be able to be removed without damaging the surface which it covers, either at the end of the manufacture or even only at the time of sale of the article.

There may be employed for this purpose plastic films constituted for example by cellulose acetate, nitrocellulose, benzyl-cellulose, etc., rendered plastic by various organic solvents or by camphor, castor oil, etc.

There can likewise be utilized thin sheets of guttapercha, coatings having a base of india rubber, etc.

In the case of cellulosic plastic materials, adhesion is obtained either by a partial dissolution of the plastic material and calendering, or by hot calendering, or again by direct pouring of a film, precautions being taken lest it be too adhesive; for example the surface to be protected may be first moistened with benzine, or with a body precipitating the solution.

In the case where the protective coating is constituted by a sheet of gutta-percha, it suffices to calender the sheet in such a way that the adhesion may be sufficient but not too high.

All the varnishes or films are applied on the top or "right side" of the support to be protected, that is to say upon the face which will be seen when the article is finished.

What we claim is:

1. The method of temporarily protecting the surface of leather, fabric or similar articles during their manufacture and handling which consists in applying to the surface to be protected a layer of benzyl-cellulose mixed with castor oil so that it is moderately adhesive to said surface and easy to be peeled off, when protection of said surface is no longer required.

2. The method of temporarily protecting the surface of leather, fabric or similar articles during their manufacturing and handling, which comprises applying to the surface to be protected a thin layer of benzyl-cellulose mixed with a plastifying agent so that it is moderately adhesive to said surface, and easy to be torn off when protection of said surface is no longer required.

ROBERT SCHNEIDER.
ARMAND POELMAN.